United States Patent
Chen et al.

(10) Patent No.: US 6,754,795 B2
(45) Date of Patent: Jun. 22, 2004

(54) METHODS AND APPARATUS FOR FORMING LINKED LIST QUEUE USING CHUNK-BASED STRUCTURE

(75) Inventors: Jian-Guo Chen, Basking Ridge, NJ (US); David E. Clune, Califon, NJ (US); Hanan Z. Moller, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 204 days.

(21) Appl. No.: 10/029,680

(22) Filed: Dec. 21, 2001

(65) Prior Publication Data

US 2003/0120879 A1 Jun. 26, 2003

(51) Int. Cl.[7] ................................................. G06F 12/06
(52) U.S. Cl. ....................................... 711/170; 707/100
(58) Field of Search ................................ 711/154, 170, 711/171, 173; 707/100

(56) References Cited

U.S. PATENT DOCUMENTS

| 5,850,395 A | 12/1998 | Hauser et al. | |
| 6,233,244 B1 | 5/2001 | Runaldue et al. | |
| 6,298,339 B1 | 10/2001 | Björnson | |
| 6,505,283 B1 | * | 1/2003 | Stoney ........................ 711/170 |
| 6,526,314 B1 | * | 2/2003 | Eberle et al. ................ 600/523 |
| 6,578,131 B1 | * | 6/2003 | Larson et al. ................ 711/216 |

FOREIGN PATENT DOCUMENTS

EP 0 622 922 A1 11/1994

OTHER PUBLICATIONS

T. Siladin, "Improving File System Performance for Lookups in Large Directories," Department of Computer Science, College of William and Mary, pp. 1–41, Dec. 1997.

* cited by examiner

Primary Examiner—Kevin L. Ellis
(74) Attorney, Agent, or Firm—Ryan, Mason & Lewis, LLP

(57) ABSTRACT

A processing system comprises processing circuitry and memory circuitry coupled to the processing circuitry. The memory circuitry is configurable to maintain at least one queue structure representing a list of data units (e.g., pointers to packets stored in a packet memory). The queue structure is partitioned into two or more blocks (e.g., chunks) wherein at least some of the blocks of the queue structure include two or more data units. Further, at least some of the blocks of the queue structure may include a pointer to a next block of the queue structure (e.g., a next chunk pointer). Given such a queue structure, the processing circuitry is configurable to address a first block of the queue structure, and then address a next block of the queue structure by setting the next block pointer of the first block to point to the next block.

18 Claims, 5 Drawing Sheets

METHODS AND APPARATUS FOR FORMING LINKED LIST QUEUE USING CHUNK-BASED STRUCTURE

FIELD OF THE INVENTION

The present invention relates generally to data processing systems, and more particularly to techniques for forming a linked list queue using a chunk-based structure.

BACKGROUND OF THE INVENTION

As is known, in a router or other type of packet switch of a packet processing system, packets that pass through and/or are processed by the router are maintained, at least temporarily, in a packet buffer memory. Typically, a memory data structure known as a linked list queue is maintained in association with the packet buffer memory. A linked list queue contains a list of pointers respectively pointing to each memory location in the packet buffer memory in which data associated with each packet is stored.

A conventional queue structure typically stores, in one continuous, sequential list, each pointer associated with each packet that is currently stored in the packet buffer memory. Each pointer in the list, however, may be stored at non-contiguous memory locations of the memory in which the queue resides. When a packet from the packet buffer memory is to be processed in some operation performed by the router, the link list queue must be accessed or addressed such that the pointer associated with that packet is obtained. Thus, with the conventional linked list structure, queue accessing must be done each and every time a pointer needs to be obtained and a packet is to be processed.

However, as processing speeds associated with routers or other packet switches increase (e.g., 10 gigabits per second and faster), the input and output bandwidth and access latency associated with the memory used to maintain the linked list queue becomes critical. That is, given the fact that a conventional queue must be accessed each and every time a packet pointer is needed, the queue memory can become a significant bottleneck.

It is therefore apparent that a need exists for techniques which address these and other drawbacks associated with the use of a single, non-contiguous linked list queue in data processing systems.

SUMMARY OF THE INVENTION

The present invention provides techniques for forming a linked list queue using a multiple memory chunk-based or block-based structure thereby addressing the drawbacks associated with the use of conventional linked list queues in data processing systems.

In one aspect of the invention, a processing system comprises processing circuitry and memory circuitry coupled to the processing circuitry. The memory circuitry is configurable to maintain at least one queue structure representing a list of data units (e.g., pointers to packets stored in a packet memory). The queue structure is partitioned into two or more blocks (e.g., chunks) wherein at least some of the blocks of the queue structure include two or more data units. Further, at least some of the blocks of the queue structure may include a pointer to a next block of the queue structure (e.g., a next chunk pointer).

Given such a queue structure, the processing circuitry is configurable to address or access a first block of the queue structure, and then address a next block of the queue structure by setting the next block pointer of the first block to point to the next block.

Advantageously, since the data units in a given block are contiguously located in memory (while each block does not necessarily have to be), the processing circuitry has only to address the block in order to effectively address each data unit in that block. Thus, in the case where the data units are packet pointers, the queue structure need not be accessed each and every time a pointer needs to be obtained and a packet is to be processed, as with a conventional queue structure. Rather, the queue structure of the invention need only be accessed when pointers in a next block are required. This is accomplished by setting the next block pointer of the current block to point to the next block. Such a queue accessing technique significantly reduces the bandwidth and access latency requirements of the queue memory and also prevents the queue memory from becoming a bottleneck in processing operations.

In another aspect of the invention, at least one list of pointers representing available blocks of the queue structure (e.g., a free chunk list) is maintained. In this manner, the available blocks list is referenced when adding a data unit (e.g., packet pointer) to the queue structure, and is updated when removing a data unit from the queue structure and/or releasing a block. In one embodiment, two separate available blocks lists are used in tandem to increase the speed with which available blocks of the queue structure are identified and accessed.

In an illustrative embodiment, the queue structure of the invention may be associated with a traffic manager of a router or other type of packet switch.: Further, the processing circuitry and the memory circuitry used to maintain and access the inventive block-based queue structure may be implemented on one or more integrated circuits.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with an exemplary packet processing system. It should be understood, however, that the invention is more generally applicable to any data processing system in which it is desirable to avoid the memory bandwidth and access latency problems associated with conventional linked list queues.

In addition, the techniques of the invention may more generally apply to any application where a linked list structure is required or desirable and either one of the following two conditions exist: (i) the latency to access the memory storing the linked list is longer than the required time to chase the linked list; or (ii) it is desired to save the space storing the linked list per each entry.

Still further, the invention is more generally applicable to any situation in which it is necessary or desirable to maintain queues and gain the advantages of the block-based or chunk-based approach of the invention. For example, the techniques of the invention may apply to software implementations, where the inventive chunking techniques gain the advantage of minimizing the number of cache misses required to chase the linked list. In addition, the techniques of the invention afford substantial memory savings by not requiring a next entry pointer for each linked list entry.

It is to be understood that the term "processor" as used herein may be implemented, by way of example and without limitation, utilizing a microprocessor, central processing unit (CPU), digital signal processor (DSP), application-specific integrated circuit (ASIC), or other type of data processing device or processing circuitry, as well as portions and combinations of these and other devices or circuitry.

The present invention in an illustrative embodiment eliminates, or at least reduces, the drawbacks attributable to the use of a single, continuous linked list queue structure by employing a block-based or chunk-based link list queue structure in conjunction with dual available blocks lists (free chunks lists) for tracking available blocks of the linked list queue structure. Among other advantages, the invention significantly reduces the bandwidth and access latency requirements of the queue memory and also prevents the queue memory from becoming a bottleneck in processing operations.

Figure 1:
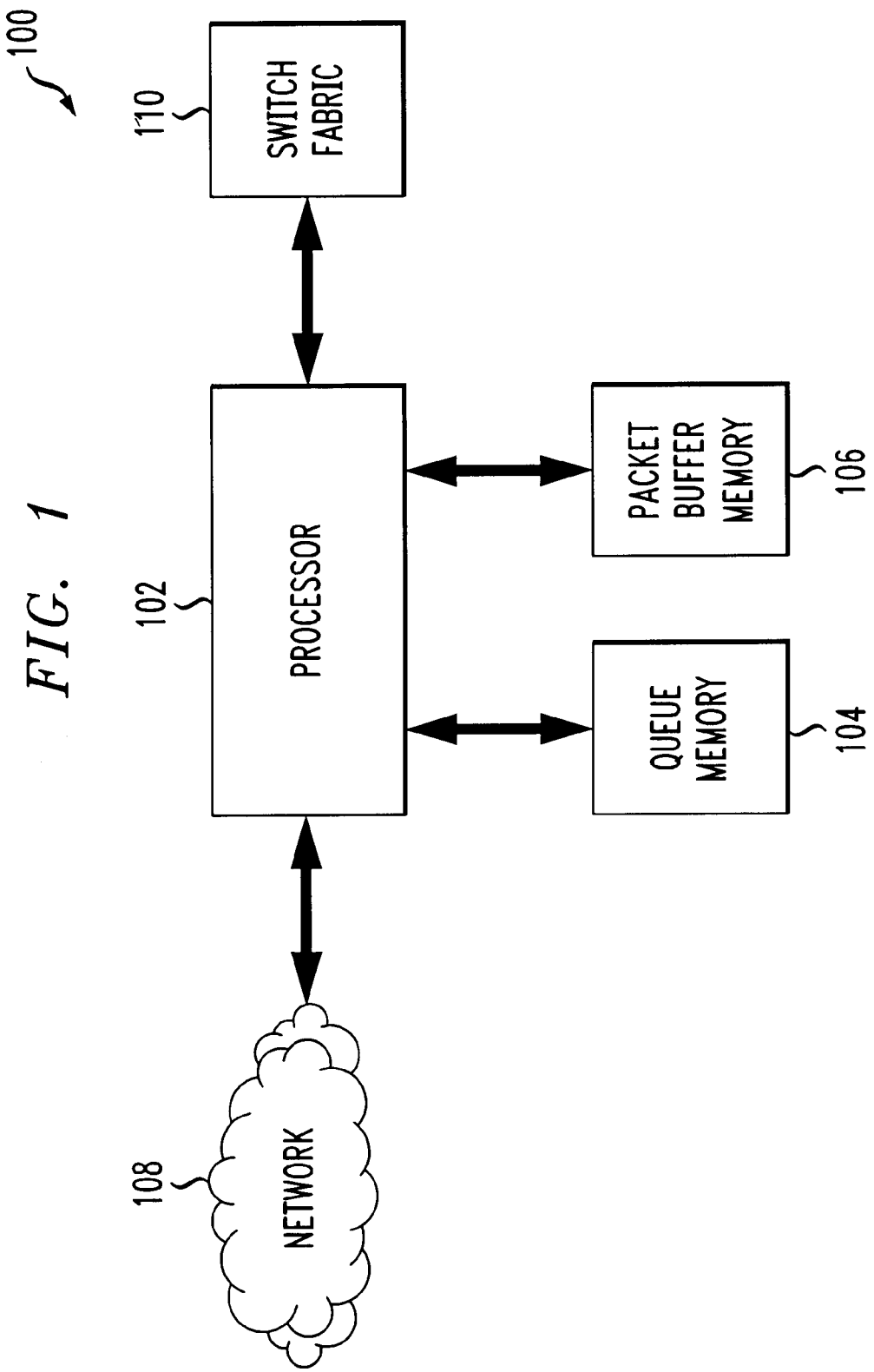
FIG. 1 is a diagram illustrating a packet processing system in which the present invention may be implemented.

FIG. 1 shows a packet processing system 100 in which the present invention may be implemented. The system 100 includes a processor 102, a queue memory 104 and a packet buffer memory 106. The processor 102 is configured to provide an interface between a network 108 from which packets and other packet data are received and a switch fabric 110 which controls switching of packets. The network may be, by way of example and without limitation, an asynchronous transfer mode (ATM) network or a synchronous optical network (SONET). The processor 102, the queue memory 104 and the packet buffer memory 106 may be implemented, e.g., as one or more integrated circuits installed on a line or port card of a router or switch. In such configuration, the switch fabric 110 is generally considered to be a part of the router or switch.

It should be understood that the particular arrangement of system elements shown in FIG. 1 is by way of illustrative example only. More particularly, as previously note, the invention can be implemented in accordance with any type of packet processor, and is not limited to any particular packet processing application.

Figure 2:
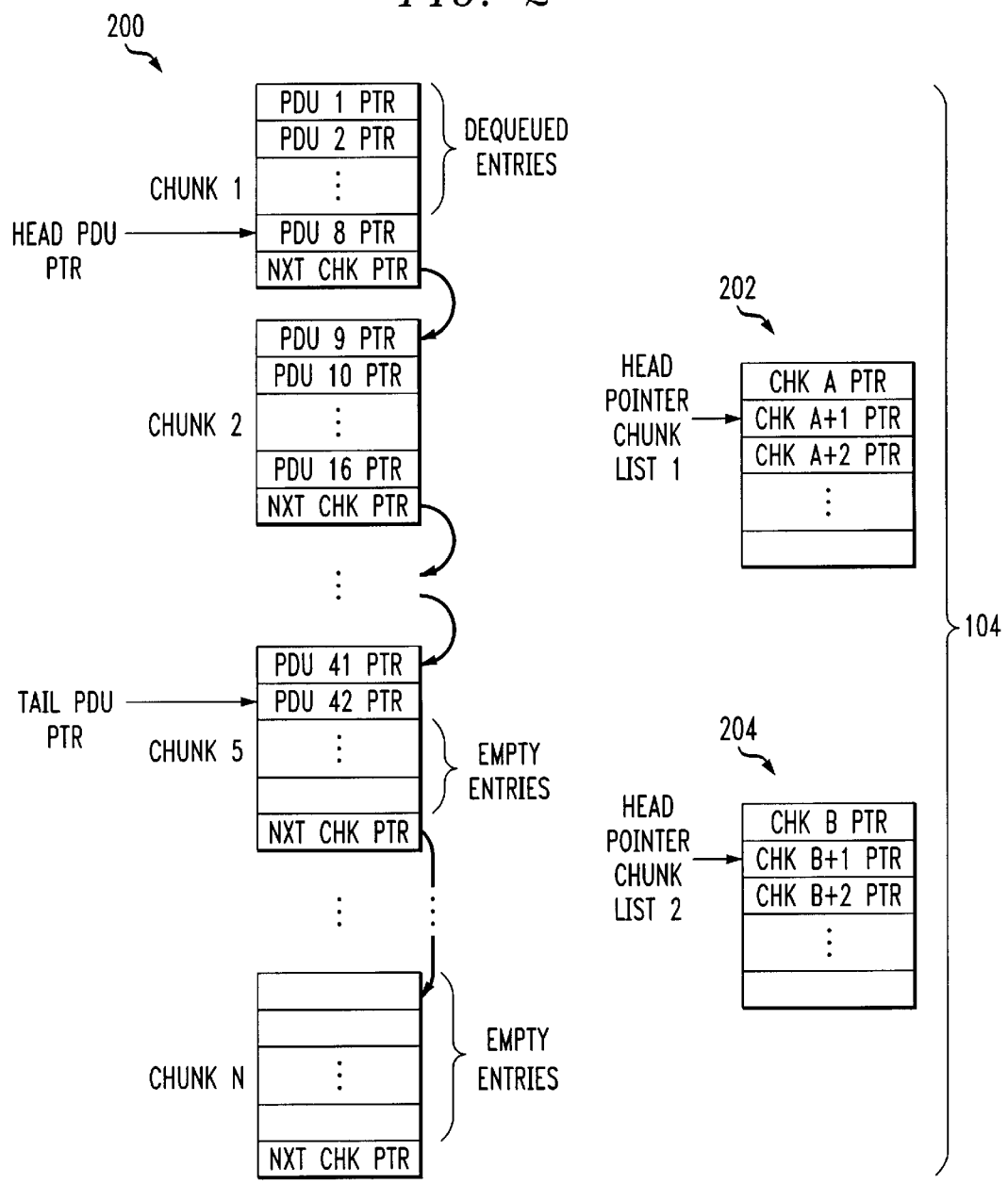
FIG. 2 is a block diagram illustrating a chunk-based linked list structure and two free chunks lists of a queue memory according to an embodiment of the present invention.

FIG. 2 shows a chunk-based linked list structure 200 and two free chunks lists 202 and 204 of a queue memory according to an embodiment of the present invention. It is to be understood that the chunk-based linked list structure 200 and two free chunks lists 202 and 204 may reside and be maintained in queue memory 104 (FIG. 1) under control of the processor 102 (FIG. 1). The chunk-based linked list structure 200 and two free chunks lists 202 and 204 may be used in association with the packet buffer memory 106 (FIG. 1).

As shown, the linked list queue structure 200 is advantageously partitioned into multiple chunks or blocks of memory denoted as chunk 1, chunk 2, . . . , chunk N, where N may be an integer equivalent to the number of chunks that the queue memory is designed to support. Each chunk contains pointers (PTRs) to packets or protocol data units (PDUs) currently stored in the packet buffer memory. As is known, the pointer points to the packet buffer memory location of a given packet (e.g., packet buffer memory 106). Further, each chunk of the queue structure contains a pointer to the next block of the queue structure. This pointer is referred to as the next chunk pointer (NXT CHK PTR). Other types of data units may be stored in the queue structure 200.

Thus, as shown in FIG. 2, each chunk is composed of contiguous memory locations wherein pointers associated with eight packets are stored, as well as the next chunk pointer. Of course, the chunk size could be larger or smaller depending on the application. Therefore, chunk 1 contains pointers for PDUs 1 through 8, plus a pointer to the next chunk, i.e., chunk 2; chunk 2 contains pointers for PDUs 9 through 16, plus a pointer to the next chunk, i.e., chunk 3; and so on.

Two distinct operations that may be performed on queue structure 200 include adding a packet pointer to the queue structure (enqueue operation) and removing a packet pointer from the queue structure (dequeue operation). As is typically the case, data is removed from the queue at the head (or start) of the queue structure and added to the: queue at the tail (or end) of the queue structure. In order to keep track of the current head and tail of the queue structure as data is added and/or removed, a head PDU pointer location is maintained along with a tail PDU pointer location.

As shown in FIG. 2, it is assumed dequeuing operations have previously occurred such that pointers for PDUs 1 through 7 in chunk 1 have been removed from the queue structure 200. Thus, the pointer location for PDU 8 in chunk 1 represents the current head of the queue. Likewise, the pointer location for PDU 42 represents the current tail of the queue. All memory locations or entries in the queue structure 200 after PDU 42 PTR are empty, with the exception of the respective pointers to the next chunk in the structure.

Given queue structure 200, the processor 102 may address or access chunk 1 of the queue structure, and then address chunk 2 of the queue structure by setting the next block pointer of chunk 1 to point to chunk 2. Of course, a chunk other than chunk 2 may be accessed after chunk 1, if necessary.

As is evident, one major advantage that the queue structure 200 has over conventional queue structures is that each chunk is composed of contiguous memory locations, i.e., a linear address range. Thus, in order to access PDUs 1 through 8, the queue structure is accessed only once, i.e., to access chunk 1. Given chunk 1 and knowledge of where it starts, the processor knows that pointers for PDUs 1 through 8 are located in a contiguous, linear address range of the queue memory. Thus, the queue structure does not have to be accessed for each and every PDU, but rather, must only be accessed for each chunk.

Also shown in FIG. 2 are free chunks lists 202 and 204. As previously mentioned, these lists may also be stored and maintained (in accordance with the processor 102) in queue memory 104 in conjunction with the queue structure 200. The free chunks lists are used to allocate available chunks to new data units being stored in the queue structure 200. The two free chunks lists are used in tandem to increase the speed with which available chunks of the queue structure 200 are identified and accessed.

It is to be understood that while only one queue structure 200 is illustrated in FIG. 2, the queue memory 104 may include multiple such queue structures, all of which may be under the control of the processor 102. Also, such a queue structure of the invention need not store only pointers to packets stored in a packet buffer memory, but rather may store other types of data units. Those ordinarily skilled in the art will realize many other applications for the inventive queue structure.

Figure 3A:
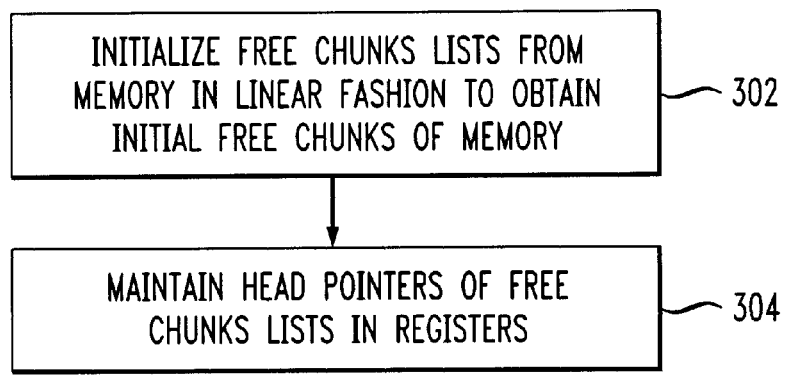
FIG. 3A is a flow diagram illustrating a method of initializing free chunks lists of a queue memory according to an embodiment of the present invention.
Figure 3B:
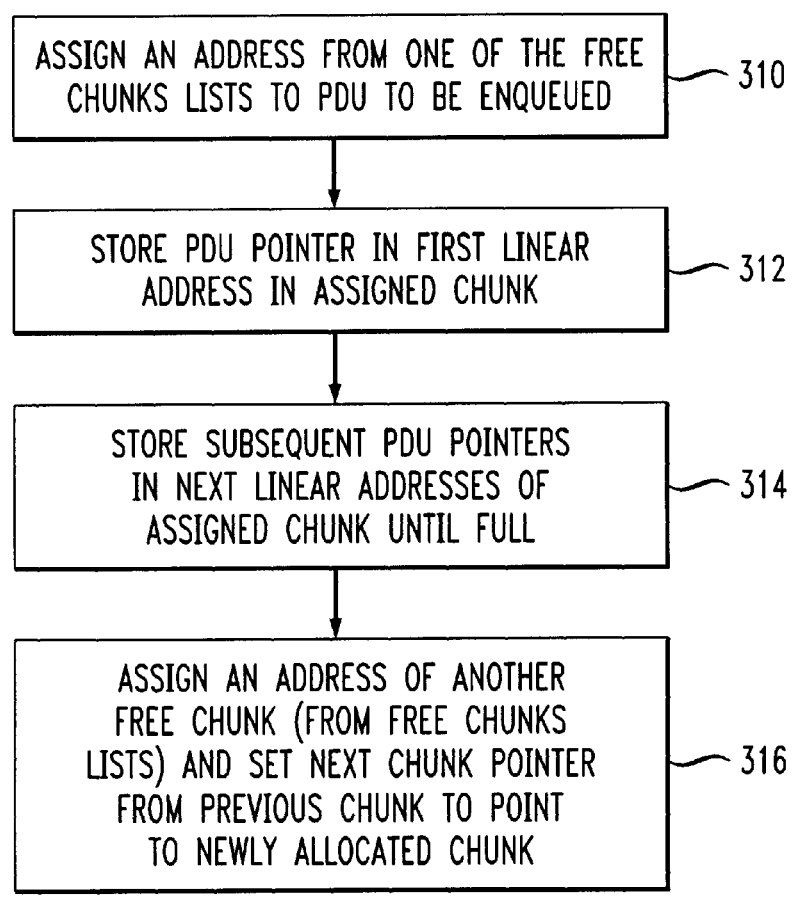
FIG. 3B is a flow diagram illustrating a method of adding data to a queue memory according to an embodiment of the present invention.
Figure 3C:
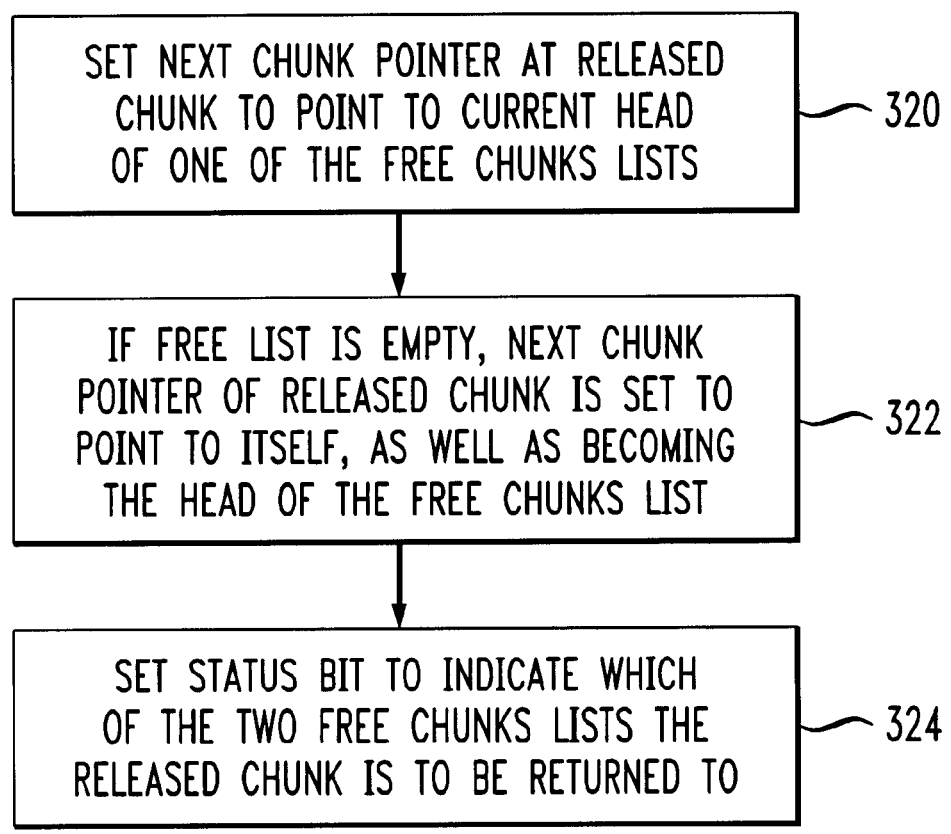
FIG. 3C is a flow diagram illustrating a method of removing data from a queue memory and releasing a chunk according to an embodiment of the present invention.

Referring now to FIGS. 3A, 3B and 3C, illustrative methodologies performed in accordance with a chunk-based queue structure and free chunks lists of the invention will now be described.

FIG. 3A shows a method of self-initializing free chunks lists (e.g., lists 202 and 204 of FIG. 2) of a queue memory according to an embodiment of the present invention. Effectively, this is how the queue structure (e.g., queue structure 200) itself may be automatically initialized. As previously mentioned, one or more free chunks lists are required to allocate chunks to new data units being stored in the queue. The invention preferably breaks a listing of free chunks into two separate lists to allow a "ping pong" or tandem technique (alternating between lists) when fetching free chunks for data to be enqueued. That is, the first list is consulted first, then the second list, followed again by the first, and so on.

The lists are first self-initialized (step 302) using the queue memory in a linear fashion to obtain the initial free chunks of memory. When the free lists reach a programmed maximum memory depth, any new chunks are allocated from the two free chunks lists. The head pointers of the two free chunks lists are maintained (step 304). These head pointers may be maintained in registers associated with a controlling processor (e.g., processor 102).

FIG. 3B shows a method of adding data to a queue memory according to an embodiment of the present invention. When a PDU is enqueued, a pointer to its memory location in the packet buffer memory is assigned an address from one of the free chunks lists (step 310). The PDU pointer is then stored in that first linear address of an assigned chunk (step 312). The next data units that are enqueued get respectively assigned to the next linear addresses in the chunk until the chunk is full (step 314). At this point, another free chunk is allocated (from one of the two free chunks lists) and the next chunk pointer from the first chunk is set to point to the new chunk allocated from the free list (step 316). One next chunk pointer is saved with the head and tail pointers for the queue. This provides the necessary time to allow the link list to be traced on subsequent dequeue operations.

FIG. 3C shows a method of removing data from a queue memory and releasing a chunk according to an embodiment of the present invention. Release of chunks occurs when the last data unit of a chunk is removed or dequeued. In this operation, the next chunk pointer at the released chunk is set to point to the current head of one of the free chunks lists (i.e., the next free chunks list due to be used in the ping pong operation), and a pointer to the released chunk becomes the new head of the free list (step 320).

If the free list is empty, the next chunk pointer of the released chunk is set to point to itself as well as becoming the head of the free list (step 322). This is done to indicate that this chunk is at the end of the free list which represents a list exhaustion condition. The dequeue operation therefore builds up the free chunks lists, which is also how self-initialization may occur. A status bit is also kept to indicate to which of the two free chunks lists the chunk is to be returned. This bit is toggled each time a released chunk is returned to ensure that both free lists stay the same length.

When operations call for the simultaneous allocation and release of a chunk, the free chunks lists are not used. Instead, the chunk released by the dequeue process is used as the chunk allocated by the enqueue process. In this way, chunk memory cycles are used more effectively.

Advantageously, by using the chunk-based queue structuring approach described herein, the linked list can be accessed at a much slower rate than the maximum rate of the overall processing system. This is due to the fact that the data units are stored linearly within a chunk and that the next chunk pointer is kept track of along with the head and tail of the queue. The time required to obtain a new next chunk pointer is determined by the length of the chunk.

Figure 4:
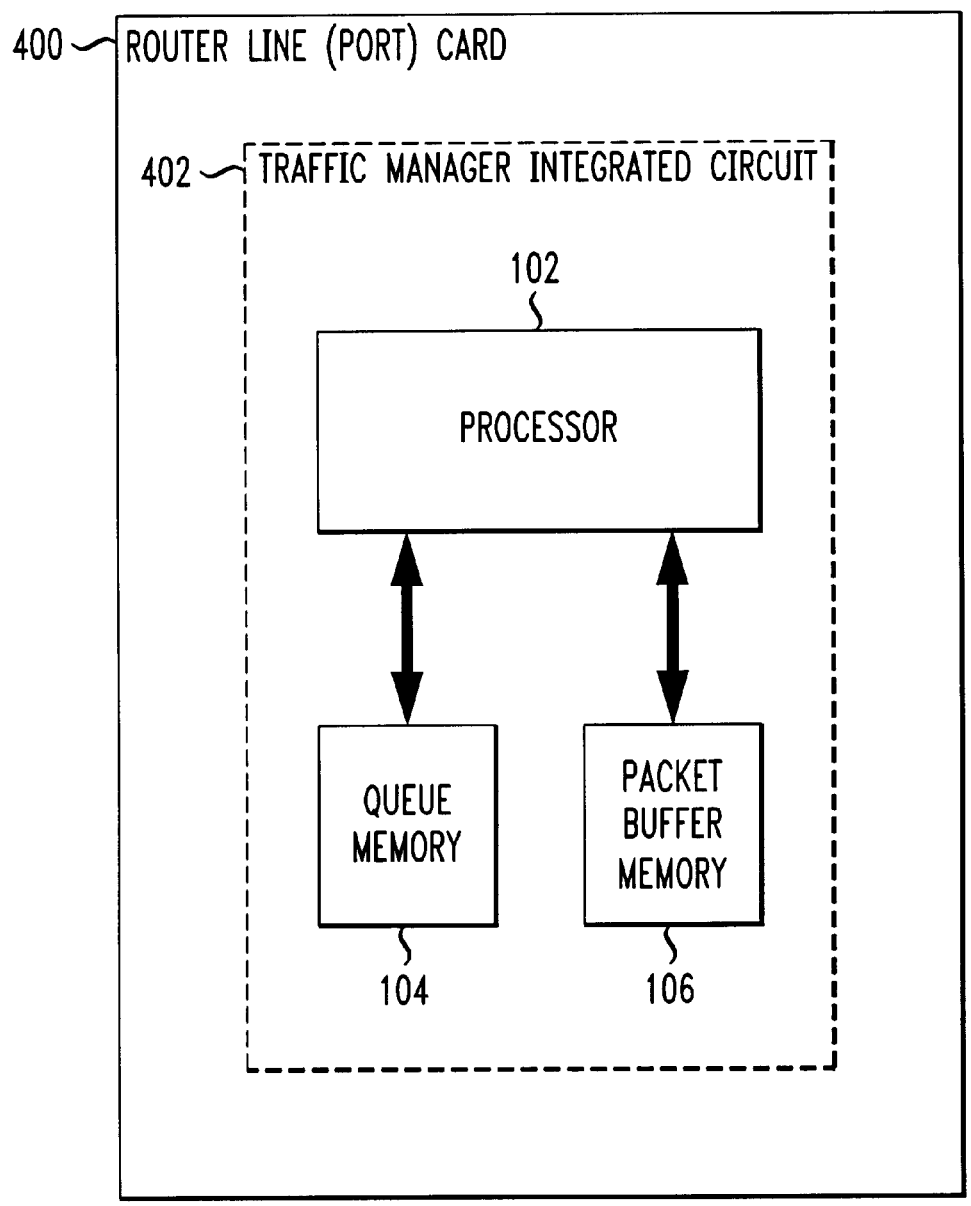
FIG. 4 is block diagram illustrating an implementation of a queue memory of the invention as part of a traffic manager integrated circuit installed on a line card of a router or switch.

FIG. 4 shows an example router or switch line (or port) card embodiment of a portion of the system 100 of FIG. 1. In this embodiment, the processing system comprises a line card 400 having at least one integrated circuit 402 installed thereon. The integrated circuit 402 comprises the processor 102, the queue memory 104 and the packet buffer memory 106.

In one embodiment, the integrated circuit 402 may be used to implement the functions of a traffic manager associated with a packet processing system. A traffic manager generally performs, among other functions, buffer management and packet scheduling.

The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A processing system comprising:
   processing circuitry; and
   memory circuitry, coupled to the processing circuitry, the memory circuitry configurable to maintain at least one queue structure representing a list of data units, the queue structure being partitioned into two or more blocks, at least some of the blocks of the queue structure including two or more data units, the at least one queue structure having a head pointer and a tail pointer associated therewith, the head pointer and the tail pointer being configurable to point to a data unit within a block.

2. The system of claim 1 wherein the data units are pointers to packets stored in a packet memory.

3. The system of claim 1 wherein at least some of the blocks of the queue structure include a pointer to a next block of the queue structure.

4. The system of claim 3 wherein the processing circuitry is configurable to: (i) address a first block of the queue structure; and (ii) address a next block of the queue structure by setting the next block pointer of the first block to point to the next block.

5. The system of claim 1 wherein the data units in a given block are contiguously located in the memory circuitry.

6. The system of claim 1 further comprising at least one list of pointers representing available blocks of the queue structure, the available blocks list being maintaining in association with the queue structure.

7. The system of claim 6 wherein the processing circuitry is further configurable to reference the available blocks list when adding a data unit to the queue structure.

8. The system of claim 6 wherein the processing circuitry is further configurable to update the available blocks list when removing a data unit from the queue structure.

9. The system of claim 1 wherein the queue structure is associated with a traffic manager.

10. The system of claim 1 wherein at least one of the processing circuitry and the memory circuitry are implemented on an integrated circuit.

11. A method for use in a data processing system, the method comprising the step of:

maintaining, in memory circuitry, at least one queue structure representing a list of data units, the queue structure being partitioned into two or more blocks, at least some of the blocks of the queue structure including two or more data units, the at least one queue structure having a head pointer and a tail pointer associated therewith, the head pointer and the tail pointer being configurable to point to a data unit within a block.

12. The method of claim 11 wherein the data units are pointers to packets stored in a packet memory.

13. The method of claim 11 wherein at least some of the blocks of the queue structure include a pointer to a next block of the queue structure.

14. The method of claim 13 further comprising the steps of:

addressing a first block of the queue structure, in accordance with processing circuitry coupled to the memory circuitry; and addressing a next block of the queue structure by setting the next block pointer of the first block to point to the next block, in accordance with the processing circuitry.

15. The method of claim 11 wherein the data units in a given block are contiguously located in the memory circuitry.

16. The method of claim 11 further comprising the step of maintaining, in association with the queue structure, at least one list of pointers representing available blocks of the queue structure.

17. A data structure comprising:

a first data block element representing two or more data units; and at least a second data block element, partitioned from the first data block element, also representing two or more data units;

wherein the first data block element and the at least a second data block element cumulatively form a queue structure representing a list of data units, the queue structure having a head pointer and a tail pointer associated therewith, the head pointer and the tail pointer being configurable to point to a data unit within a data block element.

18. The data structure of claim 17 wherein the data units are pointers to packets stored in a packet memory.

* * * * *